United States Patent
Sanchez Santisto et al.

(10) Patent No.: US 8,606,893 B2
(45) Date of Patent: Dec. 10, 2013

(54) DEVICES AND METHOD FOR GUARANTEEING SERVICE REQUIREMENTS PER USER EQUIPMENT BASIS INTO A BEARER

(75) Inventors: Guadalupe Sanchez Santisto, Madrid (ES); Ana Maria Lopez Nieto, Madrid (ES); Belén Pancorbo Marcos, Madrid (ES); Jose Javier Pastor Balbás, Madrid (ES); Victor Manuel Ávila González, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1011 days.

(21) Appl. No.: 12/513,744

(22) PCT Filed: Nov. 6, 2006

(86) PCT No.: PCT/EP2006/068150
§ 371 (c)(1),
(2), (4) Date: Jan. 5, 2010

(87) PCT Pub. No.: WO2008/055541
PCT Pub. Date: May 15, 2008

(65) Prior Publication Data
US 2010/0115071 A1   May 6, 2010

(51) Int. Cl.
*G06F 15/177* (2006.01)
(52) U.S. Cl.
USPC ........................................................ 709/222
(58) Field of Classification Search
USPC ........................................................ 709/222
See application file for complete search history.

(56) References Cited

U.S. PATENT DOCUMENTS

| 7,551,941 | B2 * | 6/2009 | Makela et al. | 455/552.1 |
| 2004/0148400 | A1 * | 7/2004 | Mostafa | 709/227 |

(Continued)

FOREIGN PATENT DOCUMENTS

| WO | WO 99/16266 | 4/1999 |
| WO | WO 01/35689 | 5/2001 |
| WO | WO 01/93607 | 12/2001 |

OTHER PUBLICATIONS

3GPP TS 23.203 v1.0.0. "3rd Generation Partnership Project: Technical Specification Group Services and System Aspects: Policy and charging control archietecture (Release 7)", May 2006. pp. 1-56.*

(Continued)

*Primary Examiner* — John MacIlwinen
(74) *Attorney, Agent, or Firm* — Nixon & Vanderhye P.C.

(57) ABSTRACT

In scenarios where service requirements are negotiated through a signalling layer whereas the services are carried out through a bearer layer, control rules are created at a control server logically interposed between the signalling and bearer layers. These control rules are based on service requirements received from an entity in the signalling layer, and are installed in an entity in the bearer layer for a bearer established therein. However, not all the service requirements negotiated through the signalling layer can be supported at the bearer layer by any user's equipment. The invention provides for a method and devices whereby the control server can create control rules based on the service requirements received from the signalling layer and also based on capabilities of the user's equipment currently used by the user, and whereby the control rules are installed for a currently established bearer or for a new subsequent bearer further established, depending on these control rules.

32 Claims, 7 Drawing Sheets

(56) References Cited

U.S. PATENT DOCUMENTS

2005/0281270 A1   12/2005  Kossi et al.
2006/0196931 A1*  9/2006   Holtmanns et al. ........... 235/380
2008/0081607 A1*  4/2008   Tangorra et al. ............. 455/425

OTHER PUBLICATIONS

International Search Report for PCT/EP2006/068150, mailed Jul. 23, 2007.

EIA/TIA Drafts, Telecommunications Industry Association, "Project No. 3-4935.012, Proposed Creation of a New TIA Standard, Service Based Bearer Control—Stage 2 (if approved, to be published as TIA-873.012)", (Aug. 14, 2006), Abstract.

ETSI Standards, European Telecommunications Standards Institute, "Digital Cellular Telecommunications System (Phase 2+)", vol. 3-SA2, No. V660, (Sep. 2005).

ETSI Standards, European Telecommunications Standards Institute, "3$^{rd}$ Generation Partnership Project", vol. 3-SA, No. V641, (Jan. 2004).

ETSI Standards, European Telecommunications Standards Institute, "3$^{rd}$ Generation Partnership Proect", vol. 3-SA2, No. V040, (Feb. 2006).

* cited by examiner

DEVICES AND METHOD FOR GUARANTEEING SERVICE REQUIREMENTS PER USER EQUIPMENT BASIS INTO A BEARER

This application is the U.S. national phase of International Application No. PCT/EP2006/068150, filed 6 Nov. 2006, which designated the U.S., the entire contents of which are hereby incorporated by reference.

TECHNICAL FIELD

The present invention generally relates to service requirements negotiated through a signalling layer, whereas said services are actually carried through a connectivity or bearer layer. In particular, the invention applies in scenarios where control rules are installed at the bearer layer for guaranteeing the service requirements for any user equipment.

BACKGROUND

Nowadays, there are scenarios where a user with a user's equipment (hereinafter UE) can negotiate with a telecommunication network, via a signalling layer, service requirements such as quality of service (hereinafter QoS) for a number of services, which are in fact carried through a separate bearer or connectivity layer provided by an access network. Amongst these scenarios, those providing an Internet Protocol (hereinafter IP) connectivity to users are particularly significant at present. In this context, the scenarios described throughout the present specification include a so-called IP Connectivity Access Network (hereinafter IP-CAN) where the users can exchange IP packets through. More specifically, a bearer or connectivity layer is a media transport, capable of carrying a plurality of IP flows, and takes place at the traffic plane. An IP flow is a unidirectional flow of IP packets with the same source IP address and port number, the same destination IP address and port number and, likely, the same transport protocol. An IP flow is thus used to transmit IP packets between an origin and a destination. Each IP flow may be associated with a service, and several IP flows may be associated with the same service.

For instance, a first scenario may be one where the user negotiates service requirements with an IP Multimedia Subsystem (hereinafter IMS), as specified in 3GPP TS 23.228 V7.5.0, whereas the services are actually carried through an IP-CAN such as a General Packet Radio Service (hereinafter GPRS) connectivity layer. In this first scenario, a Proxy Call Session Control Function (hereinafter P-CSCF) is an entry point to the IMS and is located in the signalling layer at the control plane thus aware of negotiated service requirements. On the other hand, the bearer layer in this first scenario is built up through a connection path established between the UE, a Serving GPRS Support Node (hereinafter SGSN), and a Gateway GPRS Support Node (hereinafter GGSN). A second scenario may be one where the user negotiates service requirements with an application server (hereinafter AS), such as a streaming server for video download services, whereas the services are actually carried through an IP-CAN such as a Wireless Local Area Network (hereinafter WLAN) connectivity layer. In this second scenario, the streaming server is the entity in charge of negotiating the service requirements with the UE, and is located in the signalling layer at the control plane; whereas the bearer layer is built up through a connection path between the UE, a WLAN Access Point (hereinafter WLAN AP), a WLAN Access Gateway (hereinafter WAG), and a Packet Data Gateway (hereinafter PDG). New scenarios might be apparent by having different combinations of signalling layer at the control plane with bearer layer at the traffic plane.

On the other hand, a common architecture called Policy and Charging Control (hereinafter PCC) is being currently developed under 3GPP TS 23.203 V2.0.0. This PCC is supposedly addressing all different types of access networks and is intended to control how media transported through the bearer layer is treated in view of corresponding service requirements negotiated through the signalling layer. In other words, the basic PCC architecture is suitable for being applied in scenarios where services are negotiated through the signalling layer, between user equipments and servers in the control plane; whereas said services are actually carried through the connectivity or bearer layer, possibly between originating and destination user equipments.

In accordance with 3GPP TS 23.203, the PCC architecture includes a so-called Policing and Charging Rules Function (hereinafter PCRF) in charge of defining network control for detection of particular IP flows associated with a given service, making decisions based on information received from the signalling layer by creating control rules to enforce the negotiated service requirements into the bearer layer, as well as notifying the service layer about significant events occurred in the bearer layer for the given service. This PCRF is preferably located in an intermediate entity enabled to communicate with a first entity in the control plane and with a second entity in the traffic plane. The PCC architecture also includes a so-called Policing and Charging Enforcement Function (hereinafter PCEF) in charge of detecting those particular IP flows associated with a given service, and enforcement at the bearer layer of those service requirements negotiated through the signalling layer by installing the above control rules received from the PCRF. The PCEF may be included in the traffic plane and supports the connectivity or bearer layer between originating and destination user equipments. Apart from the PCEF and PCRF, the PCC architecture also includes an application function (hereinafter AF) for offering applications that require control of the IP bearer resources. In particular, the AF may reside in, or be an integral part of, a server in the control plane aware of negotiated service requirements. The AF communicates with the PCRF to transfer dynamic session information, namely service information including the negotiated service requirements, required for PCRF decisions and for creation of the control rules.

Regarding the above exemplary scenarios, and prior to registering a user in an application at the control plane such as the IMS or an appropriate application server, namely at the signalling layer, the user has to establish a bearer through the IP-CAN, that is, at the bearer layer. In particular, where the IP-CAN is a GPRS access network and the user intends to register into an IMS network, the user has to firstly activate a primary Packet Data Protocol (hereinafter PDP) Context through the GPRS access network for bearing the IMS signalling. An IMS network generally makes use of a Session Initiation Protocol (hereinafter SIP) so that, for the purpose of the present discussion, IMS signalling is conventionally understood as SIP signalling. Likewise, the establishment of a bearer through the IP-CAN is understood as the activation of a primary PDP Context in scenarios having a GPRS access network as IP-CAN. Then, once the user has established a bearer through the IP-CAN, the user can register in the application at the control plane and can negotiate with the exemplary IMS, or with the exemplary AS, or with a destination user the service requirements to be applied to the transmission of media through the bearer layer.

Figure 1A:
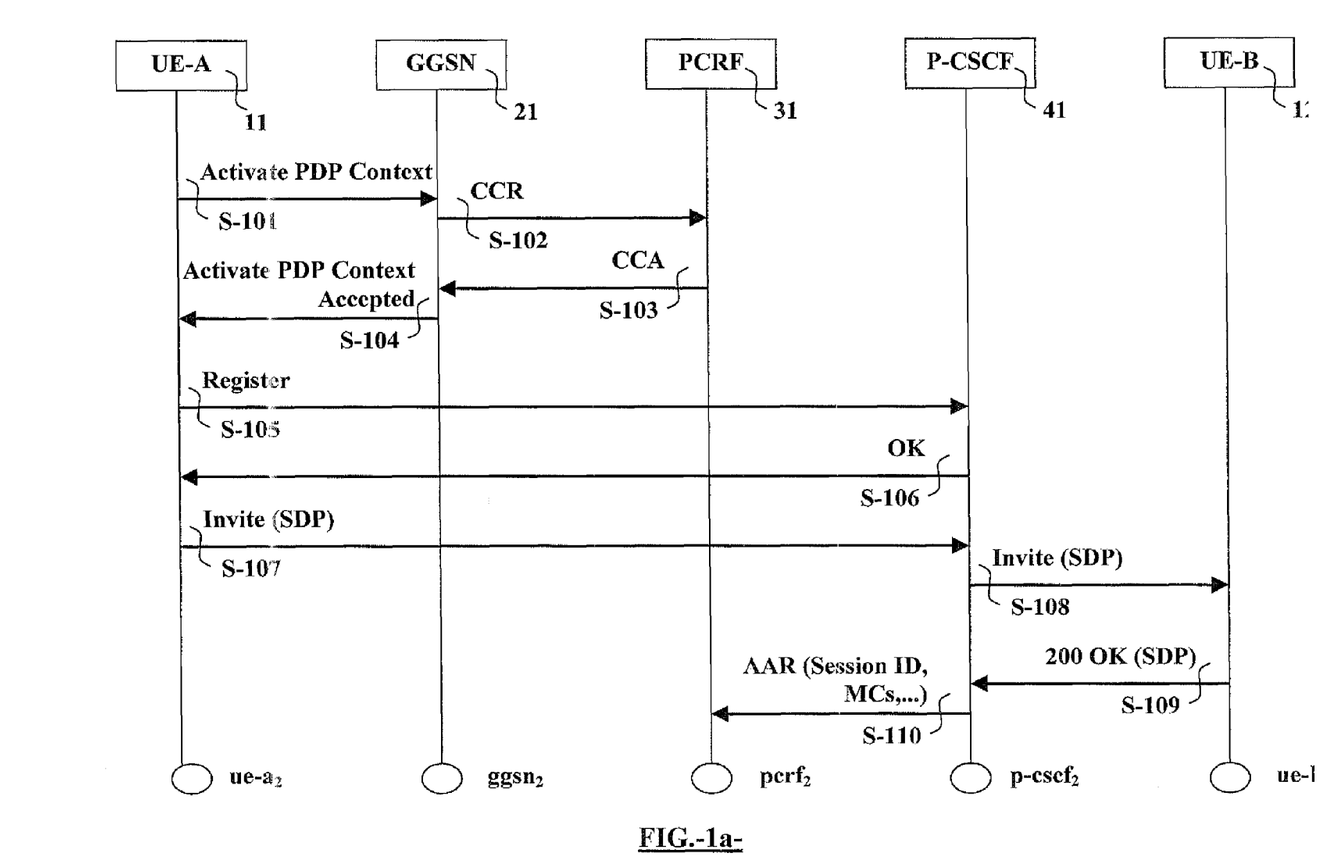
FIG. 1*a* and FIG. 1*b* represent a method in a first scenario where the user negotiates service requirements with an IMS network, whereas the services are actually carried through a GPRS network providing the connectivity layer.
Figure 1B:
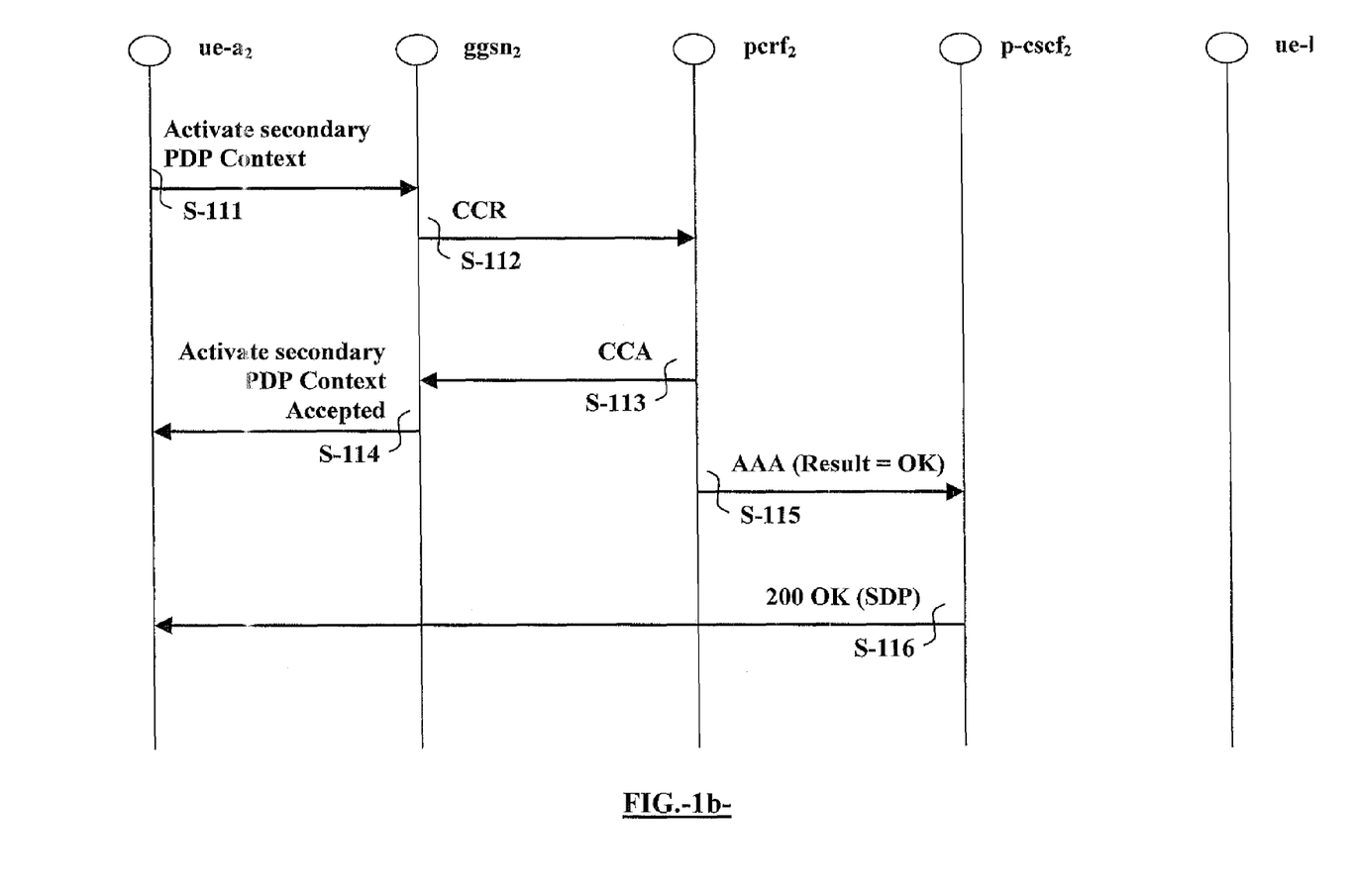

For instance, in the above first scenario where the user intends to access the IMS through a GPRS IP-CAN as illustrated in FIGS. 1a and 1b, the user requests the activation of a primary PDP Context, which is received at a GGSN via a SGSN. The GGSN submits a so-called CCR message towards the PCRF in order to request preconfigured rules to apply for the primary PDP Context for a given user. The PCRF obtains in co-operation with a subscription profile repository (hereinafter SPR) those applicable preconfigured rules indicating the services supported for the given user, and sends them back with a CCA message. Then, the GGSN confirms back to the user the activation of the primary PDP Context.

Once a bearer has been established for bearing the IMS signalling, the user can register into the IMS. To this end, the user submits a SIP Register message towards the P-CSCF, which is the entry point to the IMS and, once the user's registration has been accepted by the IMS and a Serving Call Session Control Function (hereinafter S-CSCF) has been assigned for servicing the user, the user is acknowledged with a SIP OK message indicating a successful registration. The user might want to establish a communication session with a destination user and submits a SIP Invite message to this end. At this stage, a number of service parameters, namely service requirements, are negotiated between the user equipments involved in the communication and likely the network. These service requirements are negotiated through the P-CSCF with a so-called Service Data Protocol (hereinafter SDP), and the P-CSCF eventually submits the negotiated service requirements back to the PCRF with a so-called AAR message including, amongst others, information of the media components for the negotiated communication session, the type of media (e.g. audio or video, etc), and the negotiated QoS parameters.

In a more generic scenario and in accordance with the PCC architecture basically described above, the service requirements are negotiated through the so-called AF, which sends them to the PCRF and which role is, in this first scenario, carried out by the P-CSCF. Upon receipt of these service requirements, the PCRF can determine the control rules to apply and can install them in the PCEF.

At this stage, the PCRF has to decide whether installing the control rules for the bearer presently established through the IP-CAN, which in this first scenario is the primary PDP Context where the user has registered into the IMS through the GPRS network, or waiting for the establishment of a further dedicated bearer for the negotiated service as the current trends suggest for the coming generation of user equipments.

If the PCRF decides to wait for a further dedicated bearer to be established for the negotiated service, and the UE currently used by the user in the above first exemplary scenario is capable of establishing further bearers, the GGSN may receive a request for activation of a secondary PDP Context via the SGSN. This request for activation of the secondary PDP Context activation is expected to include information that further allows the PCRF to identify the communication session and service requirements previously received from a P-CSCF or, more generally, from an AF where the service had been negotiated through. The GGSN submits towards the PCRF in the so-called CCR this information relevant for identifying the control rules to apply, and the PCRF returns back with the so-called CCA to the GGSN the control rules to be installed therein. Generally speaking, the PCRF returns to the PCEF the control rules to be installed and applied and, in this first scenario, the GGSN behaves as, or includes, the functionality of the PCEF as described in the PCC architecture. Then, once the control rules are installed at the GGSN, or more precisely at the PCEF included in the GGSN, the activation of the secondary PDP Context is confirmed back to the user, and the communication session is eventually confirmed from the PCRF towards the AF or, in this first scenario, towards the P-CSCF that includes the AF functionality.

However, if the PCRF has decided to wait for establishment of a subsequent bearer and the UE is not capable of supporting the establishment of subsequent bearers, the awaiting control rules will not be installed and the service cannot be carried out.

On the other hand, if the PCRF has decided to install the created control rules immediately for the already established bearer, and the user further requests the establishment of a subsequent bearer, the process of negotiating service requirements might be repeated though the other end, either the exemplary IMS, the exemplary AS, or a destination user, might understand the establishment of a new communication session with the same user.

SUMMARY

It is an object of the present invention to obviate at least some of the above disadvantages and provide for an enhanced mechanism for guaranteeing into a bearer layer those service requirements negotiated for a service through a signalling layer, the bearer layer being a media transport layer capable of bearing a number of service-related IP flows, whereas the signalling layer is used for negotiating how media transported through the bearer layer should be treated.

One might think that the submission and installation of the control rules for the already established bearer and an ulterior replacement of these control rules for an eventual subsequent bearer might be a reasonable solution to overcome the above problem of not having installed control rules for the bearer where the service could be carried out. However, this solution would imply more complex procedures and signalling between the PCEF and the PCRF, as well as always maintaining the previously installed control rules with a mark as a candidate to be re-installed for a subsequent bearer in case the user eventually requests such subsequent bearer activation.

Therefore, it is a further object of the present invention the provision of an enhanced mechanism for guaranteeing into the bearer layer those service requirements negotiated for the service through the signalling layer whereby the amount of signalling exchanged and actions carried out between entities in the PCC architecture are maintained at a comparable level as the one presently developed, whilst allowing the expected operability from both legacy and newer user's equipments.

The above objects are generally accomplished in accordance with the invention by providing a control server enabled to act as a PCRF for guaranteeing into a bearer layer those service requirements negotiated for a service through a signalling layer. In this respect, the bearer layer is a media transport layer capable of bearing a number of service-related IP flows, whereas the signalling layer is used for negotiating how media transported through the bearer layer should be treated.

This control server comprises a first receiver enabled to interface with an entity in the bearer layer, and arranged for receiving information about establishment of a bearer for bearing the service-related IP flows for a given user; and a second receiver enabled to interface with an entity in the signalling layer, and arranged for receiving service information about the media including those service requirements negotiated for the service. In particular, these first and second receivers may be implemented as separate elements or integrated in a receiver module with other receivers interfacing with other entities; and this receiver module 310 may be an integral part of an Input/Output module.

Regarding the entity in the bearer layer which informs the control server about the establishment of a bearer, such entity may be a GGSN where the IP-CAN is a GPRS network or a PDG where the IP-CAN is a WLAN network, or rather a PCEF in accordance with the PCC architecture, which may be included in the GGSN or PDG.

Regarding the entity in the signalling layer which submits information about the media including the negotiated service requirements, such entity may be a P-CSCF where the user has accessed an IMS network, or an AS where the user has accessed, for example, a video streaming server for downloading video, or rather an AF in accordance with the PCC architecture, which may be included in the P-CSCF or AS.

This control server also comprises in accordance with an aspect of the invention a capabilities handler arranged for obtaining UE capabilities of a user equipment currently used by the given user; a processor arranged for determining control rules to apply for guaranteeing the service requirements into the bearer, said control rules based on the service information received from the entity in the signalling layer, including the negotiated service requirements, and based on the UE capabilities of the user equipment; and an installer arranged for, depending on the UE capabilities of the user equipment, either submitting the control rules to be installed towards an entity enabled to act as a PCEF in the bearer layer, or waiting for establishment of a subsequent bearer to install the control rules therein. In this respect, both GGSN and PDG may be entities enabled to act as a PCEF, whereas both P-CSCF and AS may be entities enabled to act as an AF.

The capabilities handler in this control server may obtain the UE capabilities from an external UE capabilities repository or from a local UE capabilities repository. The former may require the inclusion of a protocol handler in the capabilities handler to facilitate such external communication. Therefore, both capabilities handler in the control server and UE capabilities repository are arranged for respectively obtaining and providing at least one UE capability selected from a group of UE capabilities comprising: QoS management; supported services per user equipment; maximum number of bearers to be subsequently established; and supported QoS model.

Generally speaking, the UE capability 'supported service per user equipment' may be used to filter existing preconfigured rules indicating supported services for the user subscription, since such existing preconfigured rules would be of no help if not supported by the UE. On the other hand, all the UE capabilities cited above, alone or in combination, are advantageous to create and adapt applicable control rules for the purpose of the invention. For instance, the above installer may either submit the control rules to be installed for a bearer already established, or wait for establishment of a subsequent bearer to install the control rules, depending on whether the maximum number of bearers to be subsequently established had been reached or not.

The above advantage taking into account 'the maximum number of bearers to be subsequently established', may be treated in combination with other UE capabilities such as the 'QoS model', to allow the network entities to take initiatives on establishment of bearers. For instance, the above installer may submit the control rules to be installed with an indication to either install said control rules for the currently established bearer, when the maximum number of bearers to be subsequently established has been already reached; or request establishment of a new subsequent bearer and installing said control rules for the new subsequent bearer once established, when the maximum number of bearers to be subsequently established has not been reached yet.

Apart from the control server and the UE capabilities repository, there is provided a corresponding method for guaranteeing into a bearer layer those service requirements negotiated for a service through a signalling layer. This method comprises corresponding steps as those actions carried out by the structural elements comprised in the control server and UE capabilities repository.

BRIEF DESCRIPTION OF THE DRAWINGS

The features, objects and advantages of the invention will become apparent by reading this description in conjunction with the accompanying drawings, in which.

DETAILED DESCRIPTION

The following describes some preferred embodiments for an enhanced mechanism for guaranteeing into a bearer layer those service requirements negotiated for a service through a signalling layer, the bearer layer being a media transport layer capable of bearing a number of service-related IP flows, whereas the signalling layer is used for negotiating how media transported through the bearer layer should be treated.

Figure 2:
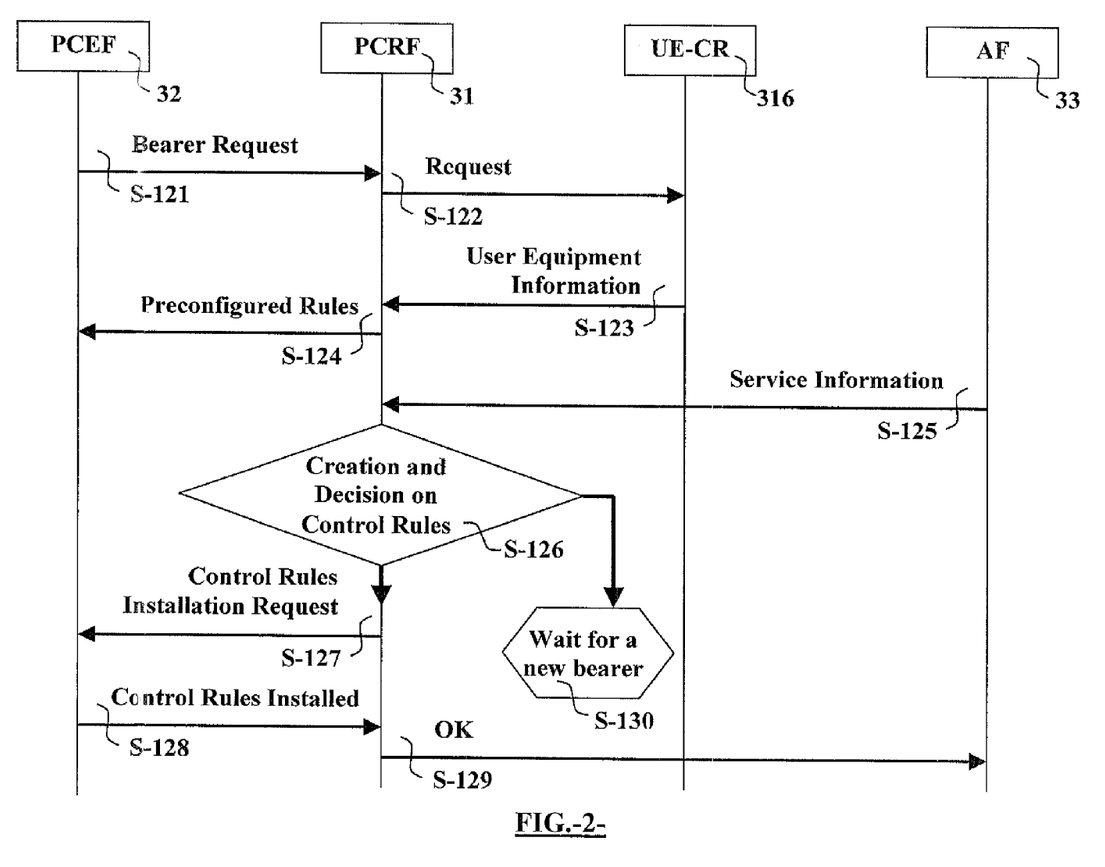
FIG. 2 represents an embodiment of a method for guaranteeing into a bearer layer those service requirements negotiated for a service through a signalling layer, the method applying in a first scenario where the user negotiates service requirements with an IMS network, whereas the services are actually carried through a GPRS network providing the connectivity layer.

FIG. 2 illustrates a generic method that can be applied in scenarios like the above first and second scenarios, which make use of a PCC architecture for guaranteeing into a bearer layer those service requirements negotiated for a service through a signalling layer. The sequence of actions in this FIG. 2 does not show the user accessing a particular IP-CAN, such as GPRS or WLAN might be in first and second scenarios respectively, and does not thus show the request for establishment of a first bearer to offer IP connectivity for the user to access an application in the control plane, such as the IMS or a video steaming AS might be.

Figure 5:
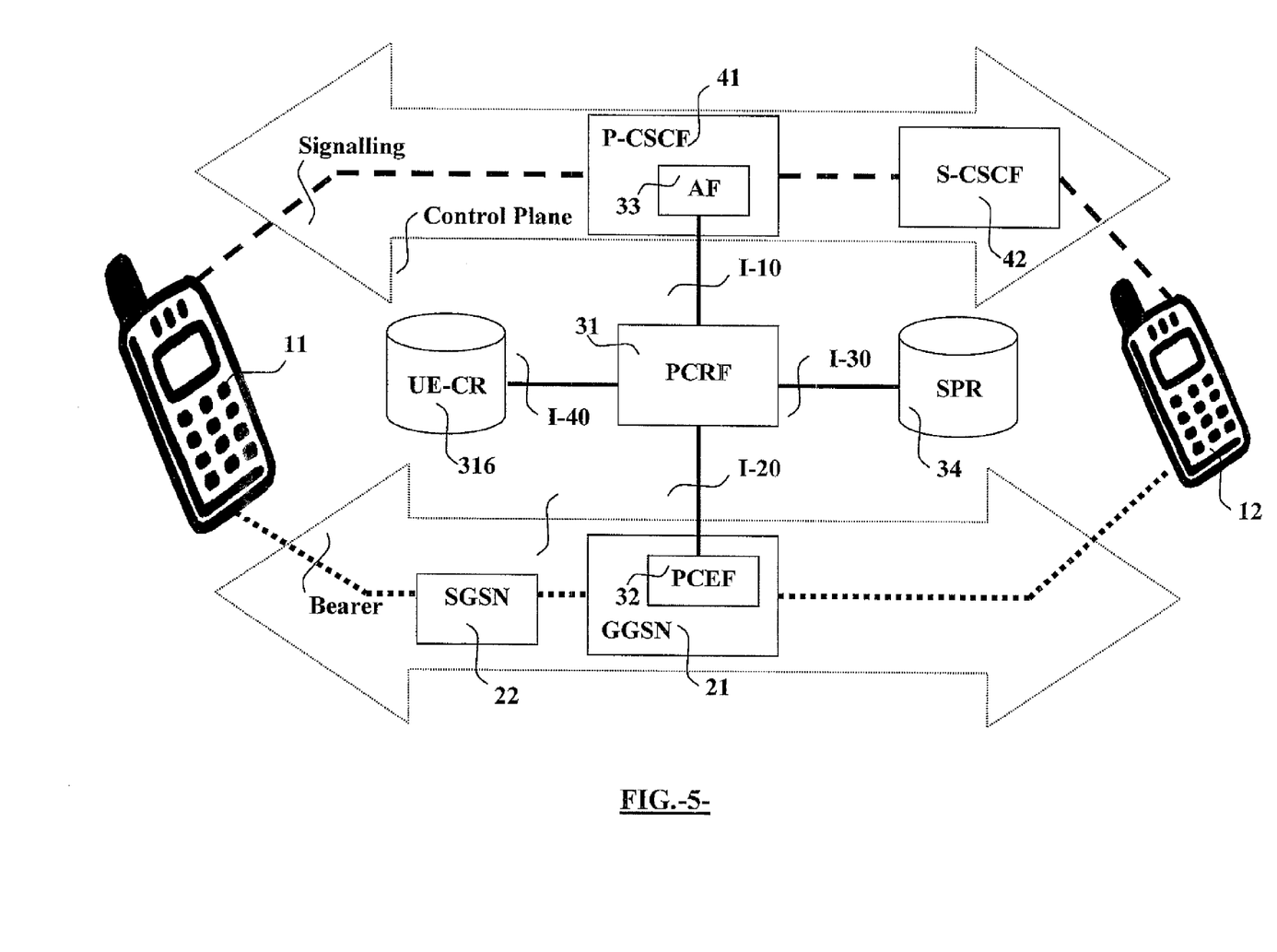
FIG. 5 shows a basic block diagram of a PCC architecture in a first scenario where the user negotiates service requirements with an IMS network, whereas the services are actually carried through a GPRS network providing the connectivity layer.
Figure 6:
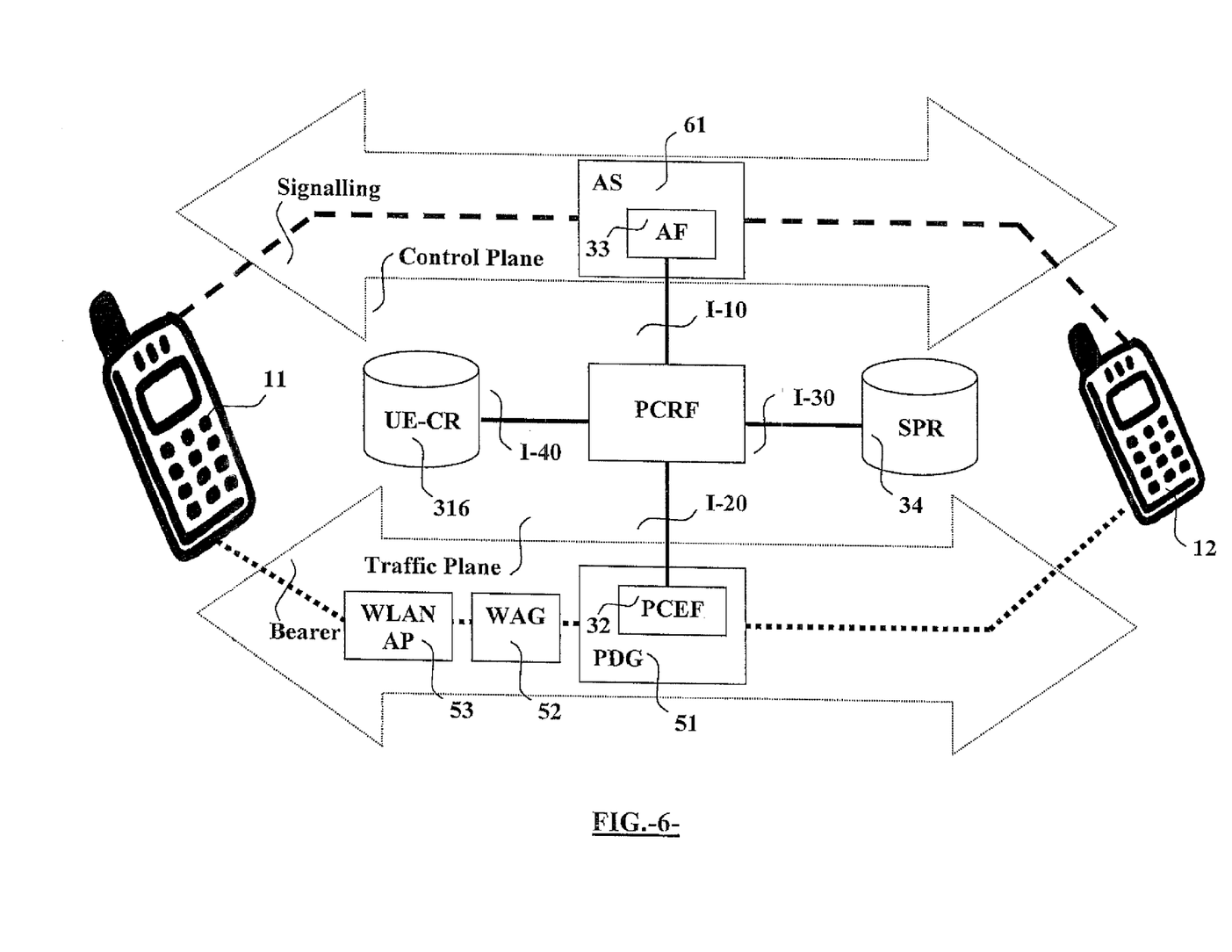
FIG. 6 shows a basic block diagram of a PCC architecture in a second scenario where the user negotiates service requirements with an application server at the control plane, whereas the services are actually carried through a WLAN network providing the connectivity layer.

The sequence of actions in this FIG. 2 starts when an entity 32 in the bearer layer, namely a PCEF which may be included in a GGSN 21 where the IP-CAN is a GPRS network or in a PDG 51 where the IP-CAN is a WLAN network as illustrated in FIGS. 5 and 6, submits in step S-121 towards a control server 31 information about establishment of a bearer for bearing the service-related IP flows for a given user in order to ask for control rules for such bearer. In particular this control server 31 receiving information about establishment of a bearer in step S-121 may be an isolated PCRF logically interposed between the signalling layer and the bearer layer in accordance with a PCC architecture, or may be incorporated in, or an integral part of, another entity located at the signalling layer or at the bearer layer. In particular, the establishment of a bearer through the IP-CAN is understood as the establishment of a PDP context in scenarios having a GPRS access network as IP-CAN. This first bearer established through GPRS for accessing the IMS, or a particular AS running a service, is generally referred to as a Primary PDP Context, whereas subsequent bearers to be further established through the GPRS access network are generally referred to as Secondary PDP Contexts. Nevertheless, for the purpose of the present invention and given that different IP-CAN are addressed, such as the exemplary cited GPRS and WLAN, this description refers to "bearer", "subsequent bearer" and "establishment of a bearer" irrespective of the exemplary IP-CAN under discussion.

Figure 3:
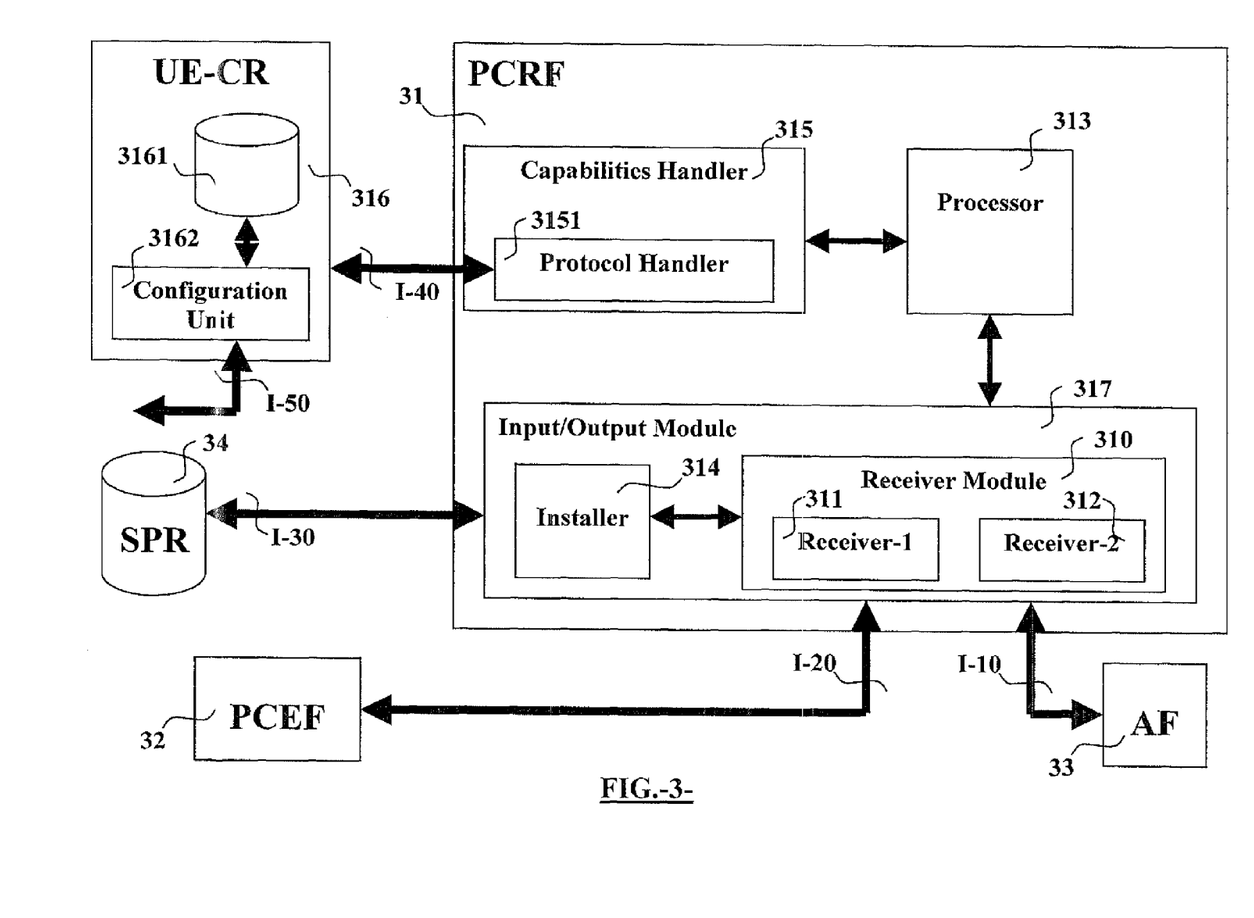
FIG. 3 illustrates a basic block diagram and structural elements of a PCRF and its connections with a PCEF, AF, SPR and an external UE capabilities repository in accordance with an embodiment of the invention.
Figure 4:
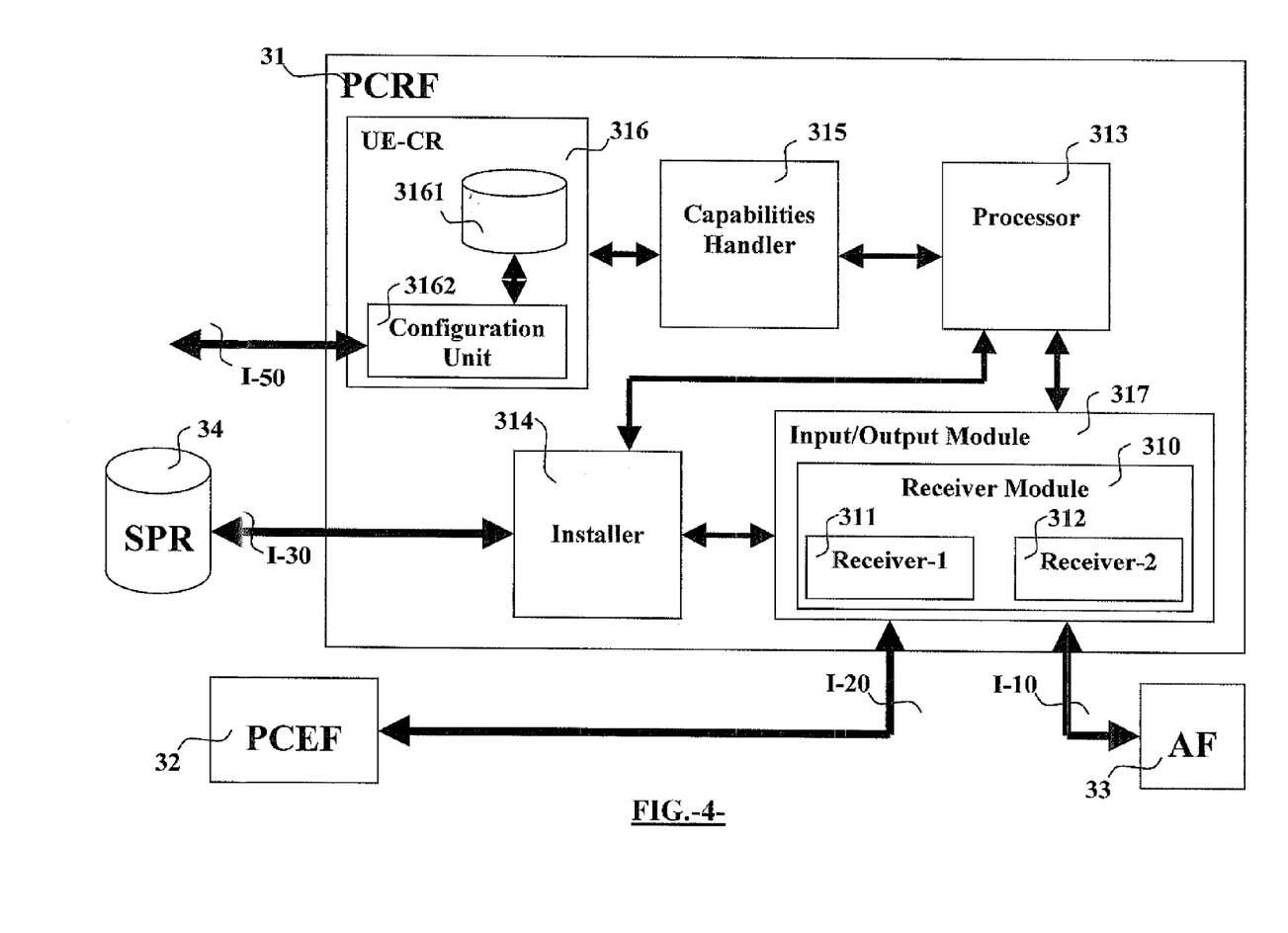
FIG. 4 illustrates a basic block diagram and structural elements of a PCRF that includes a local UE capabilities repository, and the connections between a PCRF and a PCEF, AF, and SPR in accordance with an embodiment of the invention.

To this end, the control server 31 has, as illustrated in FIGS. 3 and 4, a first receiver 311 enabled to interface with an entity 32 acting as a PCEF in the bearer layer, which in particular may be a GGSN 21 or a PDG 51, this first receiver 311 being arranged for receiving information about establishment of a bearer for bearing the service-related IP flows for a given user. Those skilled in the art may easily infer that this first receiver 311 may be implemented as a separate element or integrated in a receiver module 310 with other receivers interfacing with other entities; and this receiver module 310 may be an integral part of an Input/Output module 317 as illustrated in a non-restrictive manner in FIGS. 3 and 4.

At this stage, the control server 31 may provide back to the entity 32 acting as a PCEF in the bearer layer preconfigured rules indicating those supported services in accordance with subscription data for the given user and obtainable from a user repository 34 illustrated in FIGS. 3 and 4. However, in accordance with a nowadays preferred embodiment, this action may be postponed as shown in FIG. 2 until obtaining at the control server in steps S-122 and S-123 from a UE capabilities repository 316 those UE capabilities of a user equipment 11 currently used by the given user. Once the control server 31 has received UE capabilities, the preconfigured rules can be advantageously filtered to assess that the supposedly supported services are effectively supported by the UE capabilities of the UE currently in use by the user. Then, the resulting preconfigured rules may be sent back in step S-124 to the entity 32 acting as a PCEF in the bearer layer. These preconfigured rules indicating services supported by the UE capabilities is an advantageous achievement over the currently existing mechanism since the services supported by the user subscription may be not supported by the UE currently in use by the user.

To this end, the control server 31 includes a capabilities handler 315 arranged for obtaining UE capabilities of a user's equipment 11 currently used by the given user. In the nowadays preferred embodiment recently commented above, the control server 31 may also include an installer 314, which amongst other tasks further commented, is also arranged for submitting in step S-124, towards the entity 32 acting as a PCEF, those resulting preconfigured rules indicating those services supported by the UE capabilities for the established bearer. Particularly applicable for this and other purposes, the UE capabilities of user equipments obtainable from the capabilities handler 315 include information about those services supported per user equipment. The installer 314 may be provided as a separate module in the control server 31 as exemplary shown in FIG. 4, or integrated into the Input/Output module 317 as exemplary shown in FIG. 3.

In one embodiment of the invention illustrated in FIG. 4, the control server 31 includes a local UE capabilities repository 316 internally communicated with the capabilities handler 315 for storing the UE capabilities of the user equipment 11. Therefore, the step S-122 of obtaining the UE capabilities includes a step of consulting the local UE capabilities repository 316 for the UE capabilities.

In another embodiment of the invention illustrated in FIG. 3, the capabilities handler 315 included in the control server 31 comprises a query protocol handler 3151 to obtain the UE capabilities of the user equipment 11 from an external UE capabilities repository 316. Therefore, the step S-122 of obtaining the UE capabilities includes a step of querying the external UE capabilities repository 316 for the UE capabilities. In a further embodiment not shown in any drawing, this query protocol handler 3151 may be included in the Input/Output module 317, as for the installer 314 illustrated in FIG. 3. This implementation may be advantageous if a unique input/output module is wanted to centralize connections for external communications.

In accordance with embodiments of the invention, the UE capabilities repository 316 is arranged for providing UE capabilities of user equipments 11, 12 in use by a number of users. To this end, the UE capabilities repository has storage 3161 for the UE capabilities per user basis and a configuration unit 3162 for being provisioned with the UE capabilities of the user equipments 11, 12. In particular, the configuration unit 3162 may be provisioned with UE capabilities through an interface I-50 from a network operator provisioning system, or may as well be connected with dedicated configuration servers under premises of UE suppliers for being provisioned with UE capabilities on an equipment model basis. Where the UE capabilities repository 316 is provided as a local entity included in the control server 31 in accordance with an embodiment commented above and illustrated in FIG. 4, the configuration unit 3162 may be separable from the storage 3161 to allow the inclusion of the configuration unit 3162 in the Input/Output module 317, as for other arrangements explained above.

Once the entity 32 acting as a PCEF, which in particular may be the GGSN 21 where the IP-CAN is a GPRS network or the PDG 51 where the IP-CAN is a WLAN network as illustrated in FIGS. 5 and 6, has received the preconfigured rules in step S-124 as illustrated in FIG. 2, the GGSN 21 or PDG 51 confirms towards the user the establishment of such bearer, and the user can start the negotiation of media through the signalling layer, namely through the AF 33 in accordance with the PCC architecture, at the control plane as illustrated in FIGS. 5 and 6.

The sequence of actions in FIG. 2 continues once the service requirements for the media have been negotiated through the AF 33 in the signalling layer, and the AF submits in step S-125 service information about the media, including those service requirements negotiated for the service, towards the control server 31. In particular, this AF 33 may be a P-CSCF 41 enabled to act as AF where the user has accessed the IMS for invoking a service therein, or an AS 61 enabled to act as AF where the user has accessed, for example, a video streaming server for downloading video, as FIGS. 5 and 6 respectively illustrate.

Once the service information about the media, including those service requirements negotiated for the service, has been received at the control server 31 during step S-125, the control server determines during step S-126 those control rules to apply for guaranteeing the service requirements into the bearer, the control rules being based on the service information received from the entity in the signalling layer, namely from the AF 33, and including the negotiated service requirements, and the control rules being also based on the UE capabilities of the user equipment 11 currently in use by the user, as likely obtained from the UE capabilities repository 316 in step S-123.

To this end, the control server 31 includes as illustrated in FIGS. 3 and 4, a second receiver 312 enabled to interface with an entity 33 acting as an AF in the signalling layer, which in particular may be a P-CSCF 41 or an AS 61 as illustrated in FIGS. 5 and 6, this second receiver 312 being arranged for receiving service information about the media, including those service requirements negotiated for the service. The control server 31 also includes a processor 313 arranged for determining in step S-126 said control rules based on the service information, including the negotiated service requirements, received from the AF 33, and also based on the UE capabilities of the user equipment 11 currently in use by the user. As already commented above, this second receiver 312 may be implemented as a separate element or integrated in a receiver module 310 with the above first receiver 311, and with other receivers interfacing with other entities; and this receiver module 310 may be an integral part of an Input/Output module 317 as illustrated in a non-restrictive manner in FIGS. 3 and 4.

Particularly applicable for this and other purposes, the UE capabilities obtainable per user equipment by the capabilities handler 315 include information about QoS management, which offers information to derive the QoS class; maximum number of bearers to be subsequently established that the UE can support; and the supported QoS model, which may be network-initiated (hereinafter NW-initiated) or UE-initiated. Regarding the information about QoS management, the service information received from the AF in step S-125 may, for example, indicate that the media type is 'video' and it corresponds to QoS class 'conversational', whereas the service information may also indicate that QoS class 'conversational' is not supported; in this situation, the media type 'video' is made correspond to QoS class 'streaming' provided that such QoS class 'streaming' is supported by the UE capabilities for the UE, since the mapping is preferably performed to the highest QoS class supported by the UE capabilities. Regarding the QoS model to be applied, there may be user equipments not supporting NW-initiated modifications related to bearers, but only UE-initiated modifications. Therefore, the control server 31 takes this UE capability, the QoS model, into account before making a decision on the control rules to be installed. To this end, the processor 313 may preferably carry out a step of determining whether the QoS model to apply is NW-initiated or UE-initiated based on the UE capabilities, though other arrangements are also possible since such step might also be carried out by the capabilities handler 315. As already commented above, the UE capabilities per user equipment are obtainable by the capabilities handler 315, under some embodiments of the invention, from the UE capabilities repository 316. Therefore, the UE capabilities repository 316 is arranged for providing at least one UE capability selected from group of UE capabilities comprising: QoS management; supported services per user equipment; maximum number of bearers to be subsequently established; and supported QoS model.

The step S-126 of determining at the control server 31 the control rules to apply may offer two different outcomes depending on the UE capabilities of the UE 11 presently in use by the given user. On the one hand, the obtained UE capabilities may indicate that the UE is enabled to request the establishment of a subsequent bearer according to the service requirements. In order to determine whether a subsequent bearer can be established, the control server 31 may check whether the maximum number of bearers to be subsequently established, as indicated by the UE capabilities, has been already reached. If the control server finds out that this maximum had been reached, the UE can not request the establishment of a subsequent bearer and the control rules are installed in step S-127 for the bearer presently established at the PCEF 32, as illustrated in FIG. 2. Otherwise, if the maximum had not been reached yet and the UE capabilities indicate that only the UE-model is supported, the control server 31 may decide to continue with a step S-130 of waiting for establishment of a subsequent bearer and thus mark the present control rules as waiting for installation. On the other hand, as an alternative embodiment, if the UE capabilities indicate that the NW-initiated model is supported, the control server 31 may submit the control rules in step S-127 towards the PCEF 32 in the bearer layer along with an indication to either request the establishment of a new subsequent bearer and installing said control rules for the new subsequent bearer once established, if the maximum had not been reached yet; or install said control rules in the presently established bearer where the maximum had been already reached.

To this end, the installer 314, which is included in the control server 31 and has been previously cited for other purpose, is arranged for, depending on the UE capabilities of the user equipment 11, either submitting the control rules to be installed towards an entity 32 enabled to act as a PCEF in the bearer layer, or waiting for establishment of a subsequent bearer to install the control rules therein. In one embodiment of the invention, the processor 313 of the control server 31 checks whether the maximum number of bearers to be subsequently established, as indicated by the UE capabilities, has been already reached. If the processor finds out that this maximum had been reached, the installer 314 submits the control rules to be installed for the bearer presently established at the entity 32 enabled to act as a PCEF in the bearer layer. Otherwise, if the maximum number of bearers to be subsequently established has not been reached yet, the installer is arranged for waiting for the establishment of a subsequent bearer where the control rules will be installed.

In another embodiment of the invention, the installer 314 is arranged for submitting, towards the entity 32 enabled to act as a PCEF in the bearer layer, the control rules to be installed either with an indication to install said control rules for the currently established bearer, where the maximum number of bearers to be subsequently established has been already reached; or with an indication to request establishment of a new subsequent bearer and installing said control rules for the new subsequent bearer once established, where the maximum number of bearers to be subsequently established has not been reached yet.

As already commented above, the installer 314 may be provided as a separate module in the control server 31 as exemplary shown in FIG. 4, or integrated into the Input/Output module 317 as exemplary shown in FIG. 3.

This new behaviour at the control server 31, which in particular may be the PCRF of a PCC architecture, thus accomplishes the objects of the invention as identified above. Where the control server 31 is implemented with features of the PCRF, the control rules referred to throughout this specification may include other significant fields and parameters as those included in the so-called PCC rules as specified by 3GPP TS 23.203.

Regarding implementation of embodiments, the invention can be realized by a computer program, which is loadable into an internal memory of a computer that includes input and output units as well as a processing unit. This computer program comprises executable software portions adapted to carry out sequence of actions described under the above embodiments when running in the computer. In particular, the computer program may be recorded in a carrier computer-readable medium, such as a CD-ROM.

Regarding applicability, the invention may be well applied in the above first and second scenarios, as well as in combinations thereof. In the exemplary first scenario where a user with a UE "UE-A" 11 wants to register in an IMS network through a GPRS network as IP-CAN, the user has to activate a Primary PDP Context with a GGSN 21. Then, the GGSN informs the control server 31 about a request for the activation of a Primary PDP Context, and the control server 31, which may be a PCRF in accordance with a PCC architecture, queries a UE capabilities repository 316. As obtaining the UE capabilities for the UE currently in use by the user, the control server may filter valid preconfigured rules indicating those services supported by the user subscription and by the UE capabilities, and returns these preconfigured rules towards the GGSN. The GGSN confirms towards the user the activation of the Primary PDP Context through which the user with UE 11 can access the IMS network. The user accesses the IMS through a P-CSCF 41, likely for setting a communication with a destination user with UE "UE-B" 12. Then, a negotiation of the media is carried out through entities in the signalling layer. Once the media has been negotiated through the P-CSCF 41, the P-CSCF 41, or rather an AF 33 included therein, submits service information about the media, including those service requirements negotiated for the service, towards the control server 31. The control server receiving said service information determines control rules to apply for guaranteeing the service requirements into the bearer layer. These control rules are determined based on the service information received from the AF, and based on the UE capabilities previously obtained. Depending on these control rules, the control server 31 makes a decision on whether submitting for installation said control rules towards a PCEF 32 in the bearer layer, likely included in the GGSN 21, or waiting for activation of a Secondary PDP Context if the maximum number of PDP Context has not been reached for such UE-A 11. In particular, where the UE is a legacy terminal only supporting a Primary PDP Context and no subsequent PDP Context, the control server indicates to the PCEF 32 the installation of the control rules for the currently activated Primary PDP Context.

On the other hand, where the UE is a more capable terminal supporting the activation of a Primary and some Secondary PDP Contexts, the control server 31 may either wait for activation of a Secondary PDP context, where only the UE-initiated model is supported; or submit the control rules with an indication of installing them for the currently activated PDP Context, where all possible Secondary PDP contexts had been already activated; or submit the control rules with an indication of requesting the activation of a new Secondary PDP Context, where not all possible Secondary PDP contexts had been already activated.

This exemplary applicability solves the exemplary drawback explained above and in the same scenario, though it is well applicable to other scenarios as explained hereinbefore, and thus accomplishes the objects of the invention as identified above.

The invention is described above in respect of several embodiments in an illustrative and non-restrictive manner. Obviously, variations, and combinations of these embodiments are possible in light of the above teachings, and any modification of the embodiments that fall within the scope of the claims is intended to be included therein.

The invention claimed is:

1. A control server enabled to act as a Policy and Charging Rules Function for guaranteeing into a bearer layer those service requirements negotiated for a service through a signalling layer, the bearer layer being a media transport layer capable of bearing a number of service-related IP flows, the signalling layer being used for negotiating how media transported through the bearer layer should be treated, the control server comprising:
a first receiver enabled to interface with an entity in the bearer layer, and arranged for receiving information about establishment of an initial bearer for bearing the service-related IP flows for a given user, and
a second receiver enabled to interface with an entity in the signalling layer, and arranged for receiving service information about the media including those service requirements negotiated for the service;
a capabilities handler arranged for obtaining user equipment "UE' capabilities of a user equipment currently used by the given user;
a processor arranged for determining control rules to apply for guaranteeing the service requirements into the bearer layer, the control rules based on the service information received from the entity in the signalling layer, including the negotiated service requirements, and based on the UE capabilities of the user equipment; and
an installer arranged for submitting the control rules to be installed towards an entity enabled to act as a Policy and Charging Enforcement Function in the bearer layer,
wherein the control rules apply for the initial bearer, when the UE capabilities of the UE do not support establishment of a subsequent bearer, and wherein the control rules apply for the subsequent bearer, once established, when the UE capabilities of the UE do support establishment of the subsequent bearer.

2. The control server of claim 1, wherein the installer is also arranged for submitting, towards the entity enabled to act as a Policy and Charging Enforcement Function, preconfigured rules indicating services supported by the UE capabilities for the established bearer.

3. The control server of claim 2, wherein the entity in the signalling layer submitting the service information about the media and including those service requirements negotiated for the service is an application server "AS" and is enabled to act as an application function "AF".

4. The control server of claim 1, wherein the bearer layer is provided by an IP connectivity access network "IP-CAN" operating in accordance with a GSM Packet Radio System "GPRS", wherein the bearer is established by activating a Packet Data Protocol "PDP" Context, and wherein the entity in the bearer layer submitting the information about establishment of the bearer is a Gateway GPRS Support Node "GGSN".

5. The control server of claim 1, wherein the bearer layer is provided by an IP connectivity access network "IP-CAN" operating in accordance with a Wireless Local Area Network "WLAN", and wherein the entity in the bearer layer submitting the information about establishment of the bearer is a Packet Data Gateway "PDG".

6. The control server of claim 1, wherein the entity enabled to act as a Policy and Charging Enforcement Function in the bearer layer is a Gateway GPRS Support Node "GGSN".

7. The control sewer of claim 1, wherein the entity enabled to act as a Policy and Charging Enforcement Function in the bearer layer is a Packet Data Gateway "PDO".

8. The control server of claim 1, wherein the capabilities handler includes a query protocol handler to obtain the UE capabilities of the user equipment from an external UE capabilities repository.

9. The control server of claim 1, further including a local UE capabilities repository internally communicated with the capabilities handler for storing the UE capabilities of the user equipment.

10. The control server of claim 1, wherein the UE capabilities are used by the processors to determine whether a Quality of Service "QoS" model to apply is network-initiated or UE-initiated.

11. The control server of claim 1, wherein the installer submits the control rules to be installed with an indication to install said control rules for the currently established bearer when the maximum number of bearers to be subsequently established has been already reached.

12. The control server of claim 1, wherein the installer submits the control rules to be installed with an indication to request establishment of a new subsequent bearer and installing said control rules for the new subsequent bearer once established when the maximum number of bearers to be subsequently established has not been reached yet.

13. The control server of claim 1, wherein the UE capabilities of the user equipment obtainable from the capabilities handler include at least one UE capability selected from a group of UE capabilities comprising;
   QoS management;
   supported services per user equipment;
   maximum number of bearers to be subsequently established; and
   supported QoS model.

14. The control server of claim 1, wherein the entity in the signalling layer submitting the service information about the media and including those service requirements negotiated for the service is an application function "AF" device.

15. The control server of claim 1, wherein the entity in the signalling layer submitting the service information about the media and including those service requirements negotiated for the service is a Proxy Call Session Control Function "P-CSCF" of an IP Multimedia Subsystem "IMS" and is enabled to act as an application function "AF".

16. A method for guaranteeing into a bearer layer those service requirements negotiated for a service through a signalling layer, the bearer layer being a media transport layer capable of bearing a number of service-related IP flows, the signalling layer being used for negotiating how media transported through the bearer layer should be treated, the method comprising the steps of:
   receiving, at a control server enabled to act as a Policy and Charging Rules Function, information about establishment of an initial bearer for bearing the service-related IP flows for a given user from an entity in the bearer layer; and
   receiving, at the control server and from an entity in the signalling layer, service information about the media including those service requirements negotiated for the service;
   obtaining user equipment "UE" capabilities of a user equipment currently used by the given user from a user equipment "UE" capabilities repository;
   determining at the control server control rules to apply for guaranteeing the service requirements into the bearer layer, the control rules based on the service information received from the entity in the signalling layer, including the negotiated service requirements, and based on the CE capabilities of the user equipment; and
   submitting the control rules to be installed towards an entity enabled to act as a Policy and Charging Enforcement Function in the bearer layer,
   wherein the control rules apply for the initial bearer, when the UE capabilities of the UE do not support establishment of a subsequent bearer, and wherein the control rules apply for the subsequent bearer, once established, when the UE capabilities of the UE do support establishment of the subsequent bearer.

17. The method of claim 16, further including a step of submitting, towards the entity enabled to act as a Policy and Charging Enforcement Function, preconfigured rules indicating services supported by the UE capabilities for the established bearer.

18. The method of claim 16, wherein the bearer layer is provided by an IP connectivity access network "IP-CAN" operating in accordance with a GSM Packet Radio System "GPRS", wherein the bearer is established by activating a Packet Data Protocol "PDP" Context, and wherein the entity in the bearer layer submitting the information about establishment of the bearer is a Gateway GPRS Support Node "GGSN".

19. The method of claim 16, wherein the bearer layer is provided by an IP connectivity access network "IP-CAN" operating in accordance with a Wireless Local Area Network "WLAN", and wherein the entity in the bearer layer submitting the information about establishment of the bearer is a Packet Data Gateway "PDG".

20. The method of claim 16, wherein the entity enabled to act as a Policy and Charging Enforcement Function in the bearer layer is a Gateway GPRS Support Node "GGSN".

21. The method of claim 16, wherein the entity enabled to act as a Policy and Charging Enforcement Function in the bearer layer is a Packet Data Gateway "PDG".

22. The method of claim 16, wherein the step of obtaining UE capabilities of a user equipment includes a step of querying an external UE capabilities repository for the UE capabilities.

23. The method of claim 16, wherein the step of obtaining UE capabilities of a user equipment includes a step of consulting a local UE capabilities repository for the UE capabilities.

24. The method of claim 16, further comprising a step of determining whether a Quality of Service "QoS" model to apply is network-initiated or UE-initiated based on the obtained UE capabilities.

25. The method of claim 16, wherein the alternative step of submitting the control rules to be installed includes a step of indicating said control rules to be installed for the currently established bearer, when the maximum number of bearers to be subsequently established has been already reached.

26. The method of claim 16, wherein the alternative step of submitting the control rules to be installed includes a step of requesting establishment of a new subsequent bearer and installing said control rules for the new subsequent bearer once established, when the maximum number of bearers to be subsequently established has not been reached yet.

27. The method of claim 16, wherein the UE capabilities obtainable from the UE capabilities repository include at least one UE capability selected from a group of UE capabilities comprising:
  QoS management;
  supported services per user equipment;
  maximum number of bearers to be subsequently established; and
  supported QoS model.

28. The method of claim 16, wherein the entity in the signalling layer submitting the service information about the media and including those service requirements negotiated for the service is an application function "AF" device.

29. The method of claim 16, wherein the entity in the signalling layer submitting the service information about the media and including those service requirements negotiated for the service is a Proxy Call Session Control Function "P-CSCF" of an IP Multimedia Subsystem "IMS" and is enabled to act as an application function "AF".

30. The method of claim 16 wherein the entity the signalling layer submitting the service information about the media and including those service requirements negotiated for the service is an application server "AS" and is enabled to act as an application function "AF".

31. A computer program stored on a non-transitory, computer-readable storage medium, the computer program comprising executable software adapted to carry out the method steps according to claim 16 when running in the computer.

32. The computer program of claim 31, wherein the executable software is recorded in a carrier readable in a computer.

\* \* \* \* \*